US011853315B2

(12) United States Patent
Badyan et al.

(10) Patent No.: US 11,853,315 B2
(45) Date of Patent: Dec. 26, 2023

(54) SYNCHRONIZATION BETWEEN COMPUTATIONAL INSTANCES OF A REMOTE NETWORK MANAGEMENT PLATFORM

(71) Applicant: ServiceNow, Inc., Santa Clara, CA (US)

(72) Inventors: Daniel Badyan, Tel Aviv (IL); Tom Bar Oz, Herzliya (IL); Asaf Garty, Sdei Hemed (IL)

(73) Assignee: ServiceNow, Inc., Santa Clara, CA (US)

( * ) Notice: Subject to any disclaimer, the term of this patent is extended or adjusted under 35 U.S.C. 154(b) by 447 days.

(21) Appl. No.: 16/788,843

(22) Filed: Feb. 12, 2020

(65) Prior Publication Data
US 2021/0248155 A1 Aug. 12, 2021

(51) Int. Cl.
G06F 16/00 (2019.01)
G06F 16/25 (2019.01)
G06F 16/21 (2019.01)
G06F 16/27 (2019.01)
G06F 9/54 (2006.01)
G06F 8/65 (2018.01)

(52) U.S. Cl.
CPC .............. *G06F 16/258* (2019.01); *G06F 8/65* (2013.01); *G06F 9/54* (2013.01); *G06F 16/212* (2019.01); *G06F 16/27* (2019.01)

(58) Field of Classification Search
None
See application file for complete search history.

(56) References Cited

U.S. PATENT DOCUMENTS

| 6,678,887 | B1 | 1/2004 | Hallman |
| 7,020,706 | B2 | 3/2006 | Cates |
| 7,716,353 | B2 | 5/2010 | Golovinsky |
| 7,769,718 | B2 | 8/2010 | Murley |
| 8,402,127 | B2 | 3/2013 | Solin |
| 8,561,116 | B2 * | 10/2013 | Hasek ............... H04N 21/2407 725/91 |
| 8,612,408 | B2 | 12/2013 | Trinon |

(Continued)

OTHER PUBLICATIONS

Classification of Model Transformation Approaches, Czarnecki et al., (Year: 2003).*

*Primary Examiner* — Jean M Corrielus
(74) *Attorney, Agent, or Firm* — FLETCHER YODER PC

(57) ABSTRACT

A source computational instance may be configured to operate a software application and store a first set of content related to the software application. A target computational instance may be configured to operate the software application and store a second set of content related to the software application. The software application operated by the target computational instance may apply transformation rules to received content before storing the received content in the second set of content. The source computational instance may be further configured to receive selected content chosen from the first set of content and an indication of the target computational instance, and transmit the selected content to the target computational instance. The target computational instance may be further configured to receive the selected content, apply the transformation rules to the selected content, and store the selected content within the second set of content.

20 Claims, 9 Drawing Sheets

(56) References Cited

U.S. PATENT DOCUMENTS

| | | |
|---|---|---|
| 8,832,652 B2 | 9/2014 | Mueller |
| 9,098,322 B2 | 8/2015 | Apte |
| 9,317,327 B2 | 4/2016 | Apte |
| 9,363,252 B2 | 6/2016 | Mueller |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 10,044,566 B1* | 8/2018 | Grisco ............... H04L 43/08 |
| 10,496,429 B2* | 12/2019 | Alexandrov ........... H04L 41/22 |
| 10,649,630 B1* | 5/2020 | Vora ................. G06F 21/105 |
| 10,764,124 B1* | 9/2020 | Ben Ari ............... H04L 41/12 |
| 11,025,508 B1* | 6/2021 | Madala ............... H04L 41/22 |
| 2019/0026137 A1* | 1/2019 | Alexandrov ....... H04L 41/0895 |
| 2019/0116153 A1* | 4/2019 | Deverakonda Venkata ............ H04L 29/06768 |
| 2020/0004598 A1* | 1/2020 | Brebner ............ H04L 67/2833 |
| 2020/0004755 A1* | 1/2020 | Erez ................. G06F 16/285 |
| 2020/0005523 A1* | 1/2020 | Brebner ............ G01S 5/02522 |
| 2020/0007516 A1* | 1/2020 | Westin ............... G06F 21/602 |
| 2020/0007556 A1* | 1/2020 | Brebner ............. H04W 12/63 |
| 2020/0007615 A1* | 1/2020 | Brebner .............. H04L 67/10 |
| 2020/0233678 A1* | 7/2020 | Seering ............... H04L 41/04 |
| 2020/0285977 A1* | 9/2020 | Brebner ............... G06N 5/022 |
| 2020/0341598 A1* | 10/2020 | Vora ............... H04L 41/0853 |
| 2020/0403852 A1* | 12/2020 | Ben Ari ............... H04L 41/12 |
| 2021/0081179 A1* | 3/2021 | Kenkre ............. G06F 16/2282 |
| 2021/0083945 A1* | 3/2021 | Bitterfeld ........... G06F 16/355 |
| 2021/0119876 A1* | 4/2021 | Grisco ............... H04L 43/08 |
| 2022/0365944 A1* | 11/2022 | Mehlman ........... G06F 16/252 |

* cited by examiner

SYNCHRONIZATION BETWEEN COMPUTATIONAL INSTANCES OF A REMOTE NETWORK MANAGEMENT PLATFORM

BACKGROUND

A remote network management platform may include a number of computational instances amongst other infrastructure. Each computational instance may be composed of application servers, database servers, and/or backup servers in the form of physical devices, virtual machines, or some combination thereof. Various applications may execute on the application servers, making use of the database servers as needed. Further, each computational instance may be dedicated to a particular managed network. Such a managed network may use the computational instance for application and device discovery, information technology operations or service management, security operations, and/or various other operational or administrative functions related to the managed network.

SUMMARY

It is common for a managed network to simultaneously use more than one computational instance. For example, the managed network may use a production instance for live operations and a development instance for developing, modifying, or testing applications, programs, scripts, or other logic that is targeted for eventual deployment on the production instance. Alternatively or additionally, database content or resource file content may be gathered and/or edited on the development instance before being deployed on the production instance.

In other words, the production instance may be the "official" computational instance that hosts applications and content to which the users or customers of the managed network have access. The development instance may be used by programmers and testers associated with the managed network so that new applications, content, and/or modifications thereto can be thoroughly tested in an isolated environment before being released on the production instance. Thus, changes made to the development instance only affect the development instance and have no impact on the production instance. An operational goal is to maintain the production instance in a "clean" state that includes little or no changes to its database schema, database content, application code, configuration files, or resource files that were not approved as necessary customizations for the managed network.

Nonetheless, when an application or content on the development instance is deemed ready for release, it can be moved to the production instance. This may involve identifying and exporting application code, configuration files, database content, resource files, and any other relevant data to an export file. This export file may then be downloaded and stored locally (e.g., on the laptop of an administrator of the managed network) before it is imported into the production instance.

But this conventional procedure, while useful, has certain limitations. In practice, production and development instances may be operating different versions of the remote network management platform software. Thus, importing some content of the database may fail if the database schema of the development and production instances differ. Further, the size of an export file can be quite large (e.g., gigabytes or tens of gigabytes) in some cases, and thus take up space at least temporarily on both instances as well as in the device at which it is stored in the managed network.

The embodiments herein address these and other drawbacks, limitations, and technical problems by directly synchronizing data between two or more computational instances. Notably, a user of a source instance may specify an application, database content, configuration file content, and/or resource file content associated with this application, and one or more target instances. Doing so may trigger the source instance to transmit the specified content to the target instances. Alternatively, the user of a target instance may specify the same or similar content, as well as the source instance, and the target instance may query the source instance for the content. Regardless of how this communication takes place, it may use well-defined application programming interfaces (APIs) that are supported by one or both instances. These APIs may operate in a "pull" mode in which the target instance requests content from the source instance, or in a "push" mode in which the source instance transmits the content to target instance without specific requests. In either case, after the content arrives at the target instance, the target instance may apply upgrade/downgrade rules to determine how and what parts of the content to store in its database tables.

This arrangement allows efficient transfer of content from one instance to another, even of the two instances have different database schema. Further, this arrangement also avoids the extra step of having to download, store, and then upload an export file of a potentially unwieldy size.

Accordingly, a first example embodiment may involve a source computational instance configured to operate a software application and store a first set of content related to the software application. The first example embodiment may also involve a target computational instance configured to operate the software application and store a second set of content related to the software application, wherein the software application operated by the target computational instance applies transformation rules to received content before storing the received content in the second set of content, wherein the source computational instance is further configured to receive selected content chosen from the first set of content and an indication of the target computational instance, and transmit an encoded version of the selected content to the target computational instance, and wherein the target computational instance is further configured to receive the encoded version of the selected content, apply the transformation rules to the selected content, and store the selected content as transformed within the second set of content.

A second example embodiment may involve receiving, by a source computational instance, selected content chosen from a first set of content stored by the source computational instance and an indication of a target computational instance, wherein the source computational instance and the target computational instance both operate a software application, and wherein the first set of content is related to the software application. The second example may further involve transmitting, by the source computational instance, an encoded version of the selected content to the target computational instance. The second example may further involve receiving, by the target computational instance, the encoded version of the selected content. The second example may further involve applying, by the target computational instance, transformation rules to received content. The second example may further involve storing, by the target computational instance, the received content in a second set of content, wherein the second set of content is related to the software application.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
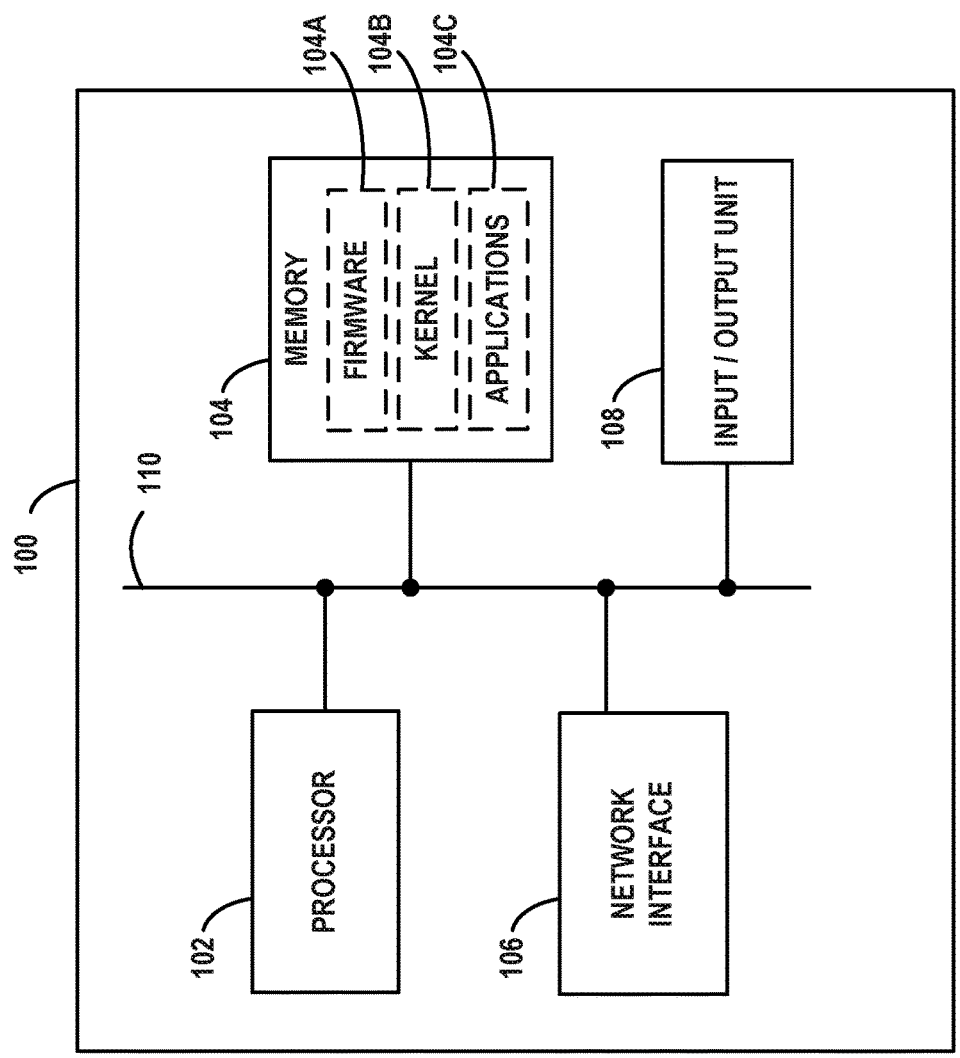
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
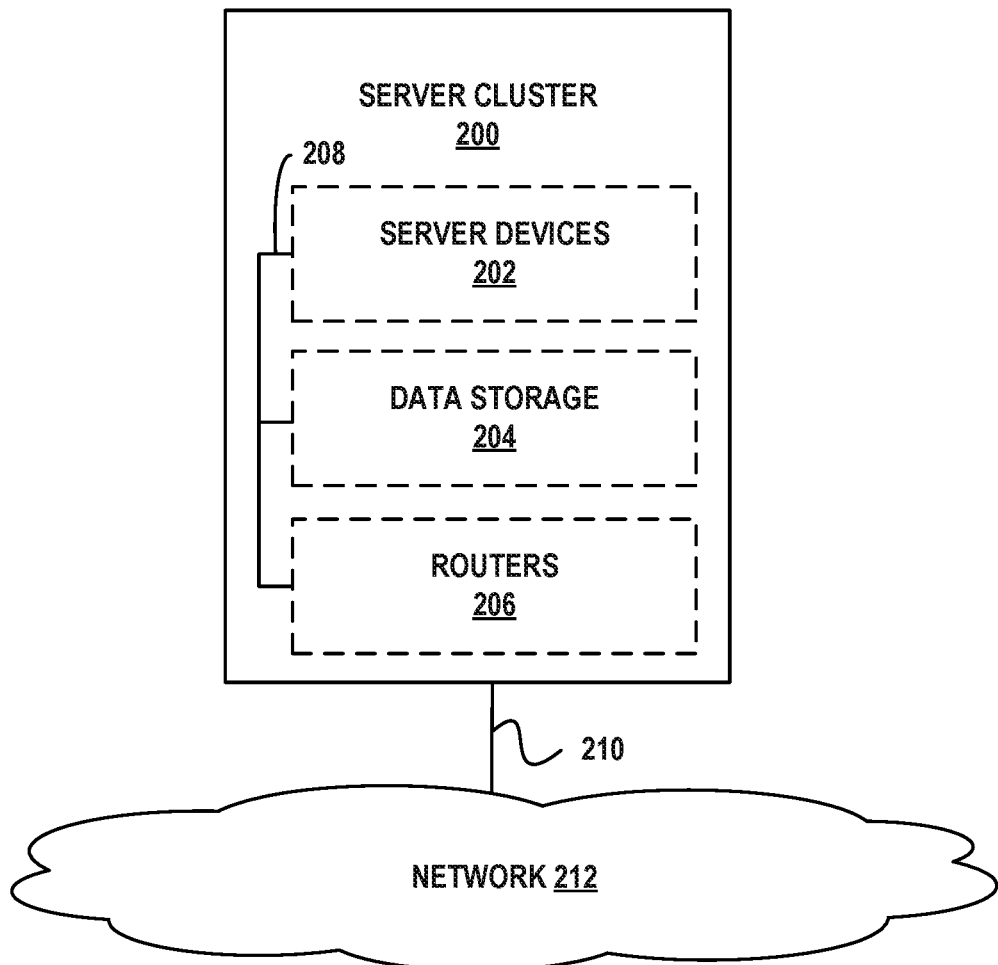
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
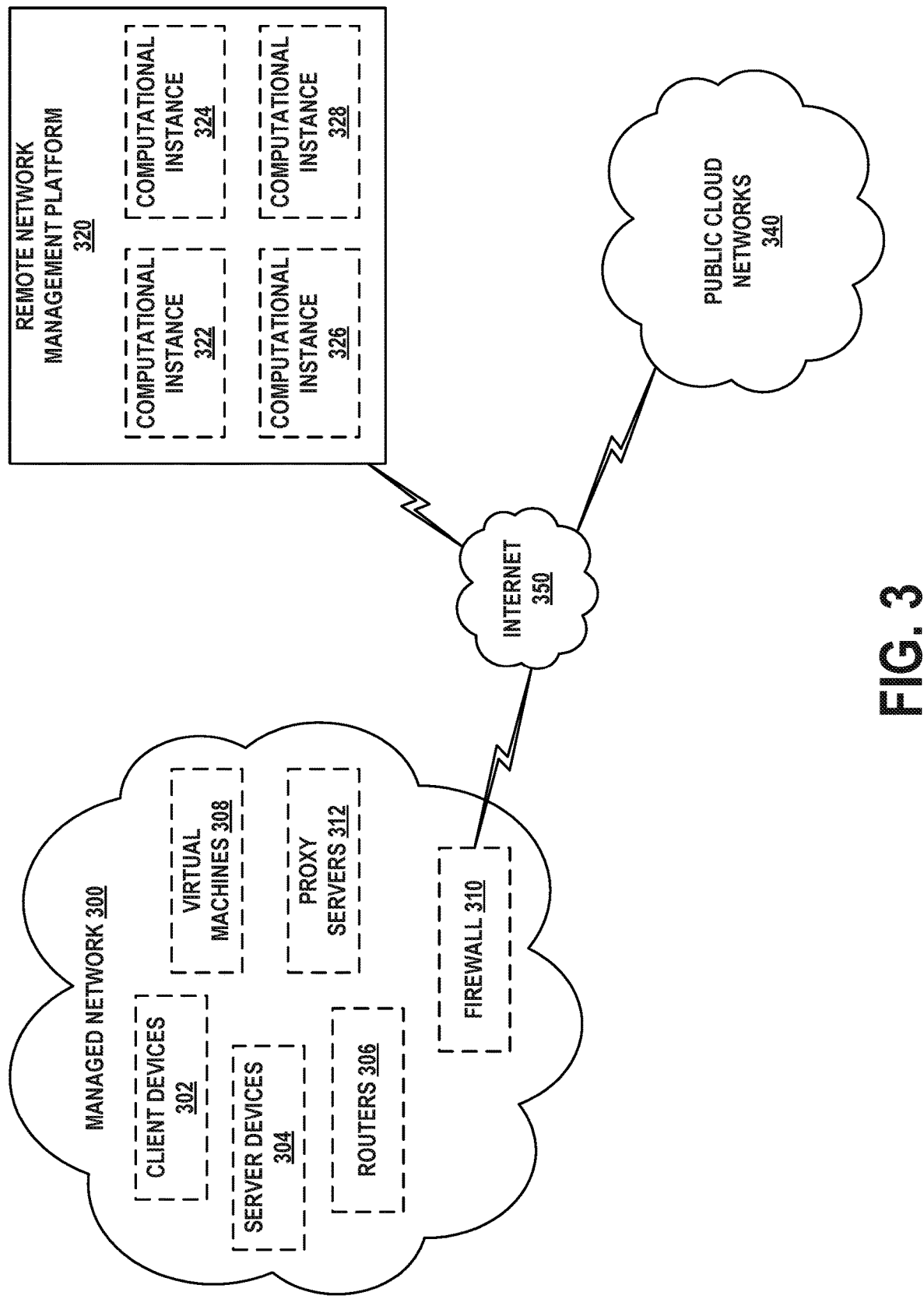
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
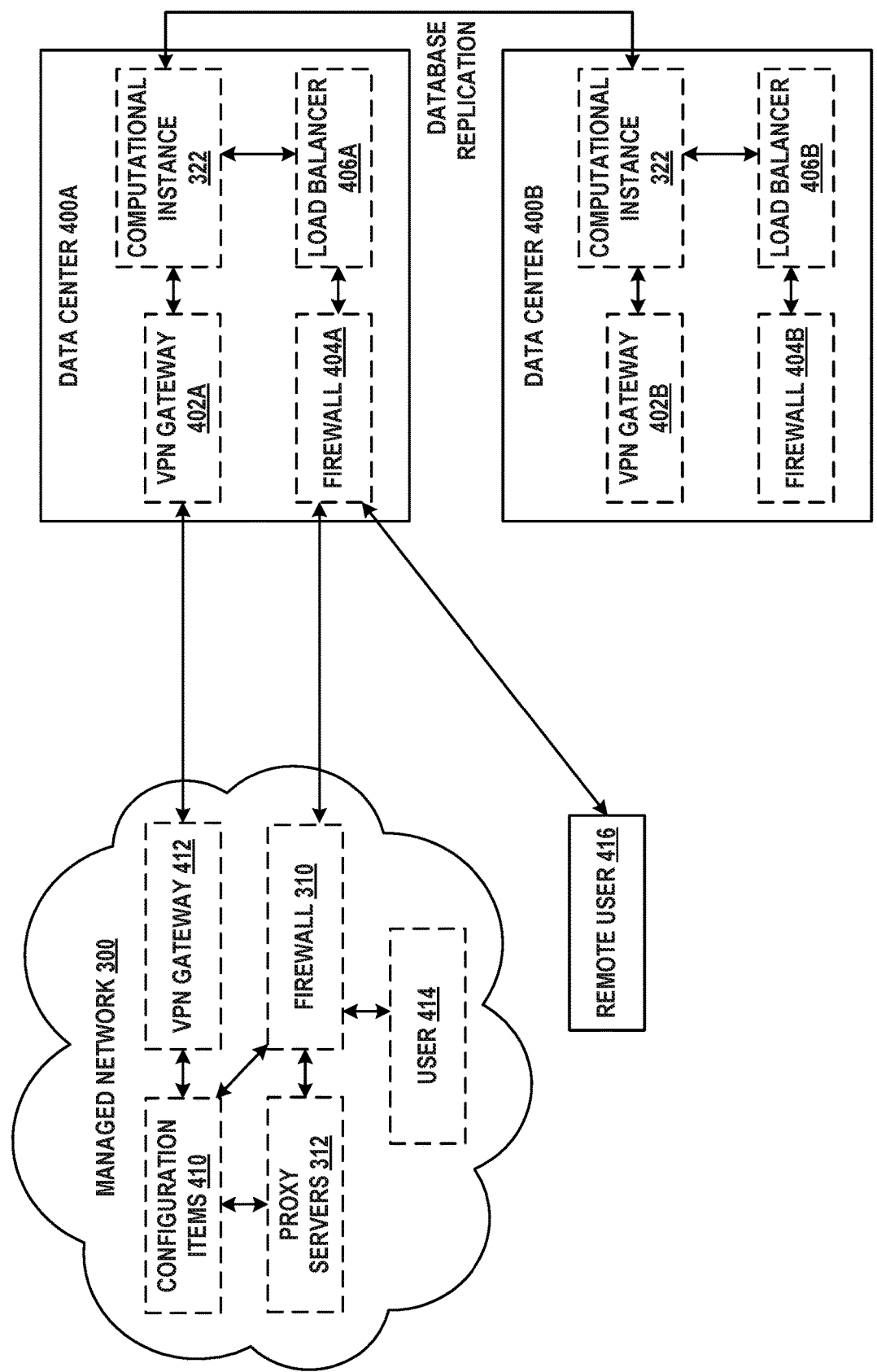
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
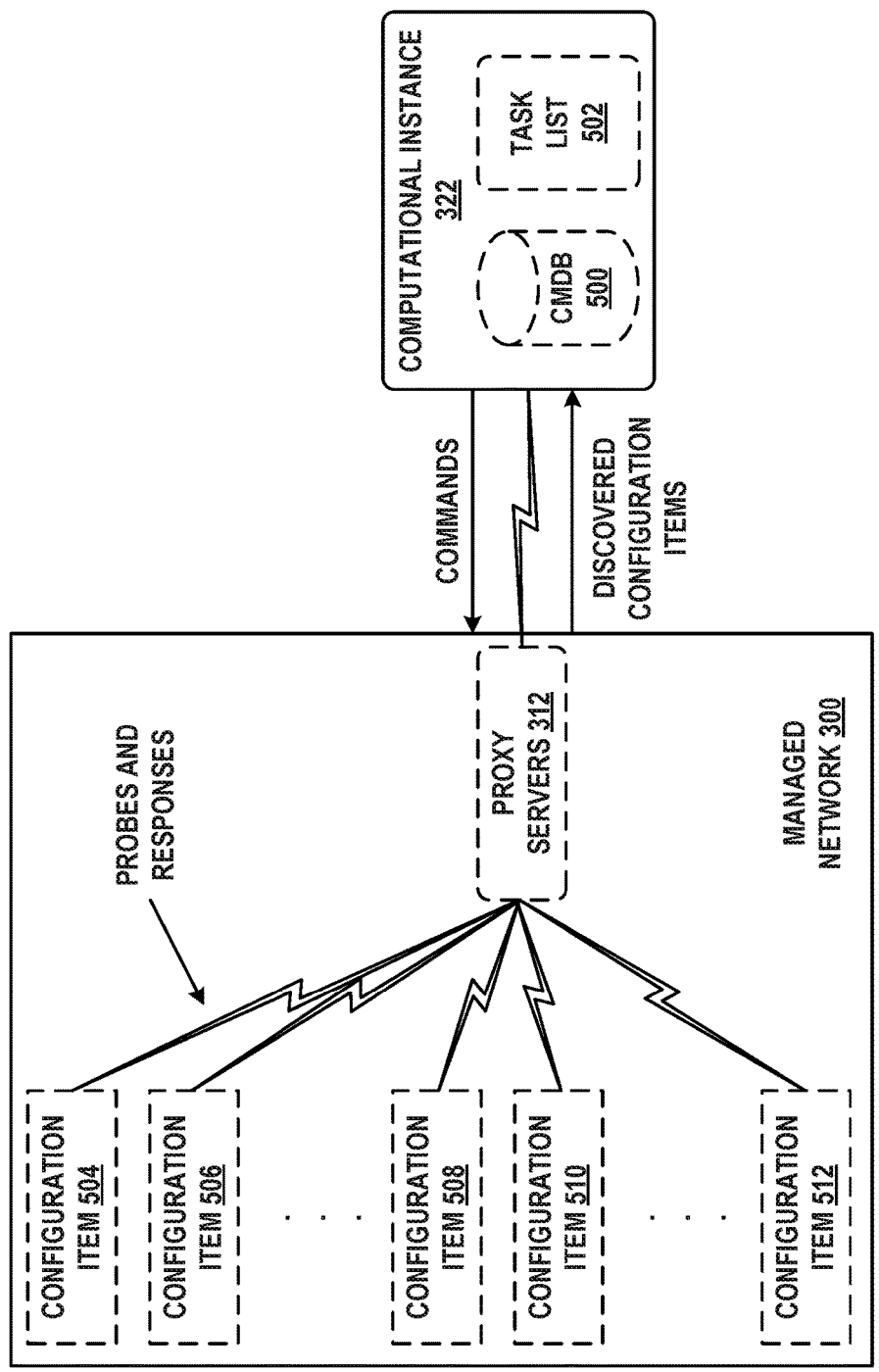
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
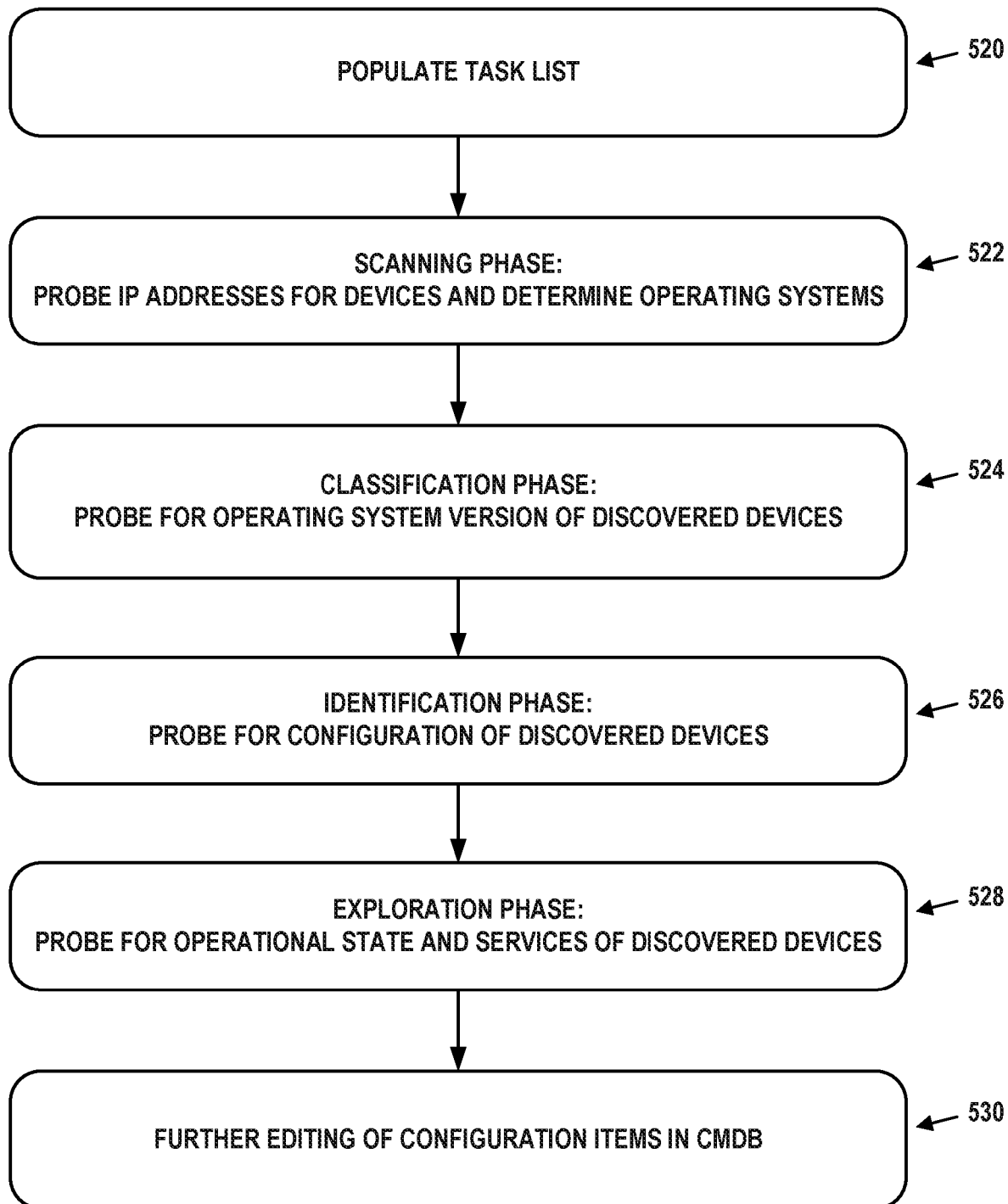
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Synchronization Between Computational Instances

As noted above, a managed network may make use of multiple computational instances. For example, computational instance 322 may be a "development instance" dedicated development of new applications, modification of existing applications, and/or collection of other content stored in its database or as resource files. Computational instance 324 may be a "test instance" dedicated to testing of this content. Thus, quality assurance personnel may obtain copies of content from the development instance, install it on the testing instance, and attempt to determine whether the content serves its intended functions. Computational instance 326 may be a "production instance" dedicated to the live operation of tested applications and services. Thus, tested content may be deployed on the production instance in order to serve the managed network and possibly its customers as well.

For purposes of this disclosure, "content" may refer to application code (e.g., source code, scripts, object code, or executable code), database schema, database entries, resource files (e.g., configuration files, graphical files, audio files, video files), and any other data that can be stored in or used by a computational instance. In some situations below, content may be more specifically defined for sake of example.

From time to time, it may be desirable to be able to transfer at least some of this content between two computational instances. For example, the managed network may copy a script-based application from a development instance to a testing instance, from a testing instance to a production instance, or from a development instance to a production instance. In another example, the managed network may copy some or all of a database between such instances.

A. Database Export and Update Sets

Traditionally, database-driven systems, such as remote network management platforms, have used database backup utilities to accomplish such tasks. For example, a database may have an administrative web page accessible to users thereof. Through this web page, a user can select one or more database tables and/or rows in these tables, and have the selected schema and data saved as an export file. The format of the export file can be SQL, XML, JavaScript Object Notation (JSON), or some other arrangement.

The user can then download the export file and store it locally until it is ready to be used. The user may upload the export file to another database instance with that database's import utility. The latter may read the export file, create tables in accordance with the saved schema, and populate these tables with the saved content.

But these procedures have significant limitations. Different computational instances may be installed with different versions of the remote network management software. It is common for development and testing instances to be using newer versions of the software than production instances. Since database schema may change between versions of the software, there can be conflicts when importing export files. Notably, export files created by instances with newer versions of the software may contain tables with new columns or may split information between tables in a different fashion as that of the older versions of the software. Thus, the import process can fail in these situations when the schema in the export file does not match the schema of the instance to which it is introduced.

Further, forcing users to select database tables and/or rows thereof may require a high level of expertise form these users. Most users of a remote network management platform view the applications and data of the platform at a higher level, and might not even know which tables are used by what applications. Therefore, the users may not be able to identify what data to export.

Moreover, transfer of large database tables may cause the export file to become large and unwieldy. A configuration item table for a large managed network can have millions of entries. Exporting even a portion of this table may cause the export file to be gigabytes in size. This results in excessive storage and network capacity usage when the export file is downloaded, stored, and transferred.

In order to overcome some of these limitations, update sets have been defined for remote network management platforms. Essentially, an update set is a recording mechanism that, when activated, logs any change made to the computational instance. Thus, an active update set may store, in an update set table, representations of changes may to configuration items, for example. An update set can also be stored in an export file, which can then be imported into another computational instance.

But update sets have their own drawbacks. As any change to a computational instance is recorded in the update set table (and then represented in the export file), extraneous changes may be included. Thus, importing update sets often introduce "noise" in the form of unintended changes to a production instance that is intended to be a clean, controlled environment. Further, update sets do not address the aforementioned challenges of moving content between computational instances using different versions of the platform software or large export file sizes.

Both the database export and update set features also fail to provide the user with suggestions or lists of content related to the data being transferred. For example, a computational instance may include an incidents table that contain representations of problems experienced by IT users (e.g., in the form of "trouble tickets"). These incidents may refer to one or more configuration items—for example, an incident involving a user who cannot access his or her email may contain a reference to the configuration item table entries for the user's primary and backup email servers. When incidents or changes thereto are exported, the related configuration items may be omitted. This can result in dangling references in the database of the target computational instance.

B. API-Based Synchronization

The embodiments herein overcome these and potentially other technical problems by providing API-based synchronization between computational instances. From a source computational instance, a user may be able to select a set of content and a target computational instance. The source computational instance may suggest related content to synchronize, which the user may also select if desired. Then the selected content is obtained and encoded for transmission to the target computational instance. For example, the content may be serialized or otherwise arranged.

The transmission may involve the source computational instance providing the encoded content to an API of the target computational instance. Alternatively, the source computational instance may make the content available by way of its own API, and then trigger the target computational instance to request and receive the content by way of this API. Once on the target computational instance, upgrade/downgrade rules may be applied to accommodate and/or modify content that was obtained from a different database schema than the one used by the target computational instance. Then, the content as modified may be written to the database of the target computational instance. In some cases, a continuous synchronization can be put in place so that further changes to the selected content can be automatically synchronized to the target computational instance.

This improved procedure has the following advantages over previous techniques: (i) it does not require that the user have an intimate knowledge of database schema structure, (ii) no export files are created, thereby eliminating related delays and storage concerns, (iii) the source and target computational instances can be synchronized even if they are using different versions of the platform software, and (iv) continuous synchronization can be employed. Other advantages may be present as well.

Figure 6:
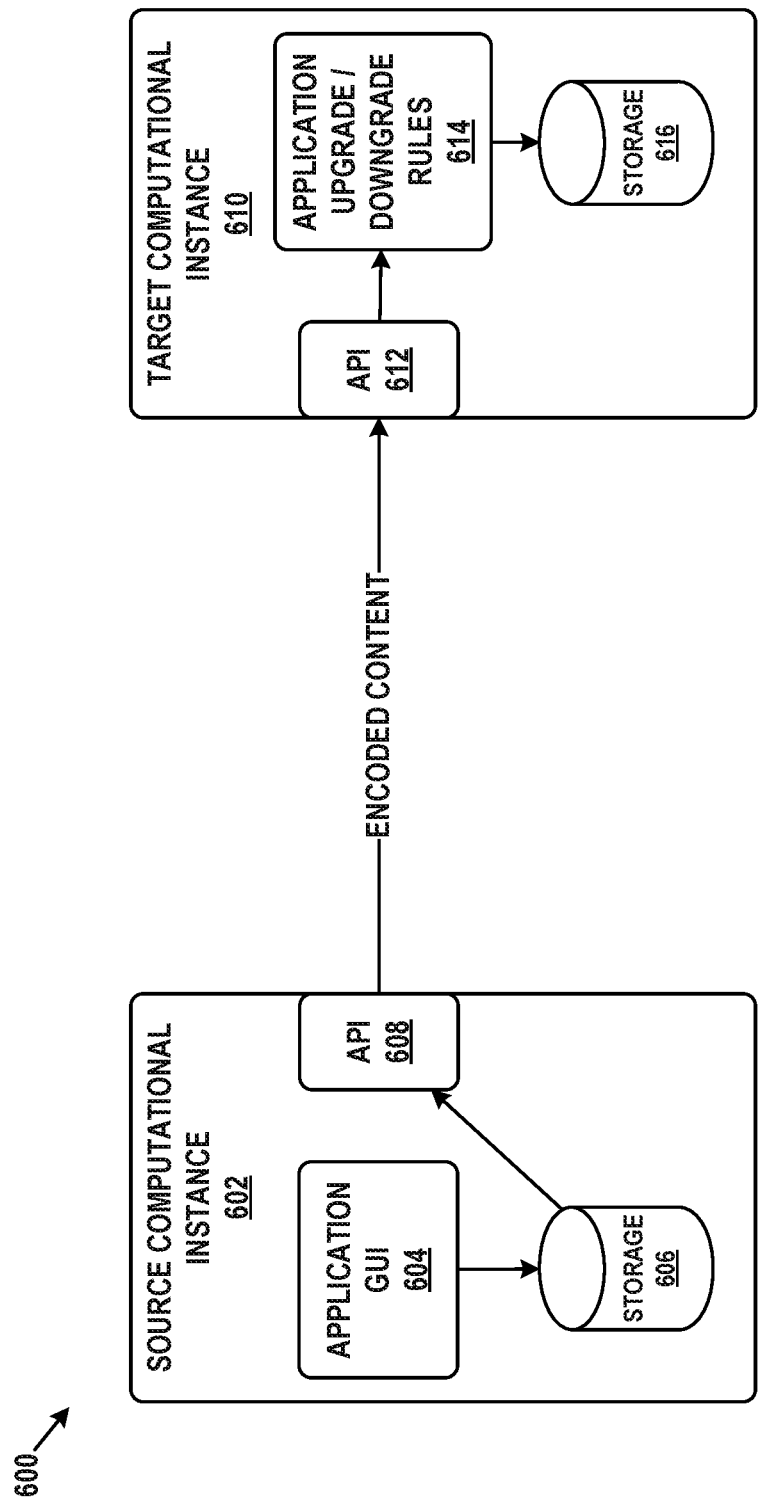
FIG. 6 is a logical diagram of computational instance synchronization, in accordance with example embodiments.

FIG. 6 provides logical diagram 600 of this synchronization system as well as a data flow through the system. Logical diagram 600 includes two computational instances, source computational instance 602 and target computational instance 610. These computational instances are presented at a high level for purposes of simplicity and may contain far more complexity in terms of applications, data content, and capabilities than is shown.

It is assumed that content from source computational instance 602 is to be provided to target computational instance 610. Source computational instance 602 may be, for example, a development instance while target computational instance 610 may be a test instance. In other arrangements, source computational instance 602 may be a test instance while target computational instance 610 may be a production instance, or source computational instance 602 may be a development instance while target computational instance 610 may be a production instance. In general, source computational instance 602 may any type of computational instance that is to synchronize its content to target computational instance 610.

Source computational instance 602 may include application GUI 604, storage 606, and API 608. Application GUI 604 may be a web-based or other visual interface presented to users of a particular application on source computational instance 604. This application may be, for example, an IT, HR, CRM, customer service, application development, or security application. The visual interface may allow the user to utilize, configure, and/or manage the application.

Storage 606 may be a database or another form of structured or unstructured data storage. For example, storage 606 could be an SQL-based database with a database schema that defines a number of database tables. Each of these tables may contain a number of named columns. Entries in each table may take the form of rows. Some entries may contain references to other tables, local or remote files, or objects in general. One or more tables may be managed or dedicated to the application associated with application GUI 604. Thus, this application may store its data in these tables for later search and/or access. Notably, any content (e.g., application code, database schema, database entries, configuration files, resource files) associated with the application may be stored in storage 606, either in a database, a file system, or as unstructured data.

API 608 may be an interface through which another application or device can request information related to the application. For example, information related to the application that is stored in storage 606 may be available by way of API 608. Thus, API 608 may implement representational state transfer (REST), simple object access protocol (SOAP), or some other mechanism, and may define ways in which the application's data can be queried. As an example, entries in a database table (e.g., values stored in its rows) named "incidents" may be made available by way of a REST API with a specific URL and set of query semantics. Properly formed queries to the API may return one of more of these entries as encoded content in XML, JSON, or some other format. API 608 may be part of the application.

Target computational instance 610 may include application API 612, application upgrade/downgrade rules 614, and storage 616. It is assumed that target computational instance 610 is configured to operate at least some of the same applications as source computational instance 602, but perhaps different versions thereof. Notably, target computational instance 610 operates some version of the application of application GUI 604.

Storage 616 may be a database or another form of structured or unstructured data storage. Like storage 606, storage 616 could be an SQL-based database with a database schema that defines a number of database tables. One or more of these tables may be managed or dedicated to the application. Thus, this application may store its data in these tables for later search and/or access. Notably, any content associated with the application may be stored in storage 616, either in a database, a file system or as unstructured data API 612 may be an interface through which another application or device can provide information related to the application. API 612 may also implement REST, SOAP, or some other mechanism, and may define ways in which the application's data can be written—directly or indirectly—to storage 616. As an example, properly formed transmissions to a specific URL of the API may cause computational instance 610 to store the information encoded in these transmissions in tables of storage 616. These tables and/or columns thereof may be specified by the URL or the body of the transmissions.

Application upgrade/downgrade rules 614 may include logic that can transform content received by way of API 612 before storing this content in storage 616. The logic may also be referred to as transformation rules, and may be specific to the application. This transformation step may be desirable in various embodiments where source computational instance 602 and target computational instance 610 are operating different versions of the remote network management platform. This means that their versions of the application may be different. It is common for source computational instance 602 to be on a newer version of the platform than target computational instance 610, but the opposite is possible. Therefore, application upgrade/downgrade rules 614 may be applied to data synchronized between these platforms.

For example, consider a database table in storage 616 containing information related to users. This table may have columns for each user's name, address, and primary phone number. But, source computational instance 602 may be operating a newer version of the application that uses a more granular database structure. Thus, the same database table for this version of the application (where the table is stored in storage 606) may contain columns for each user's name, address, postal code, primary phone number, and secondary phone number. Further, this table may also include a reference to another table representing departments of an enterprise at which the users work. Clearly, if the application's content from storage 606 is provided to storage 616 in its raw form, storage 616 will be unable to properly represent the content, and may even produce errors if the content is attempted to be written to storage 616.

Application upgrade/downgrade rules 614 include may logic that transforms content from storage 606 into a format that can be properly stored in storage 616. In the example above, this may involve: (i) combining the postal codes into the addresses, (ii) omitting (not storing) the secondary phone numbers, and (iii) omitting (not storing) the references. In other examples, more or less complex logic may be used. For instance, content in a column from storage 606 may be split across multiple columns of one or more database tables in storage 616. In some cases, application upgrade/downgrade rules 614 may modify the database schema of storage 616 (e.g., adding one or more columns to a table and/or adding one or more tables to the database schema) so that it can store the content.

Another feature may involve application GUI 604 suggesting related content to synchronize with target computational instance 610. Suppose that a user selects, via application GUI 604, several entries of the user table described above. Since this table has references to another table (the departments table), application GUI 604 may point this out and suggest that referenced entries in the departments table (or the entire departments table) be synchronized as well. The user may select or decline to do so via application GUI 604. This suggestion process can continue, for example by suggesting entries in another table referenced by either the users table or the departments table. In this manner, the user is reminded of related content that may be beneficial to synchronize.

Also, application GUI 604 may provide a continuous synchronization option. If this option is activated, all changes to selected content on source computational instance 602 are automatically provided to target computational instance 610 on an ongoing basis. This may involve a script or program executing on the background of computational instance 602 detecting changes made to storage 606, determining whether these changes are subject to synchronization to another computational instance, and if so, triggering the synchronization. In this fashion, target computational instance 610 can be kept up to date with source computational instance 602 without requiring manual initiation of synchronization procedures.

Further, the synchronization may be configured only to synchronize selected content that has not changed since the most recent previous synchronization. This may be implemented by recording the current time and date when each each unit of the content is modified, as well as recording the time and date of the most recent previous synchronization. Then, in a future synchronization, only units of content with a modification time and date later than the synchronization time and date are synchronized.

Figure 7:
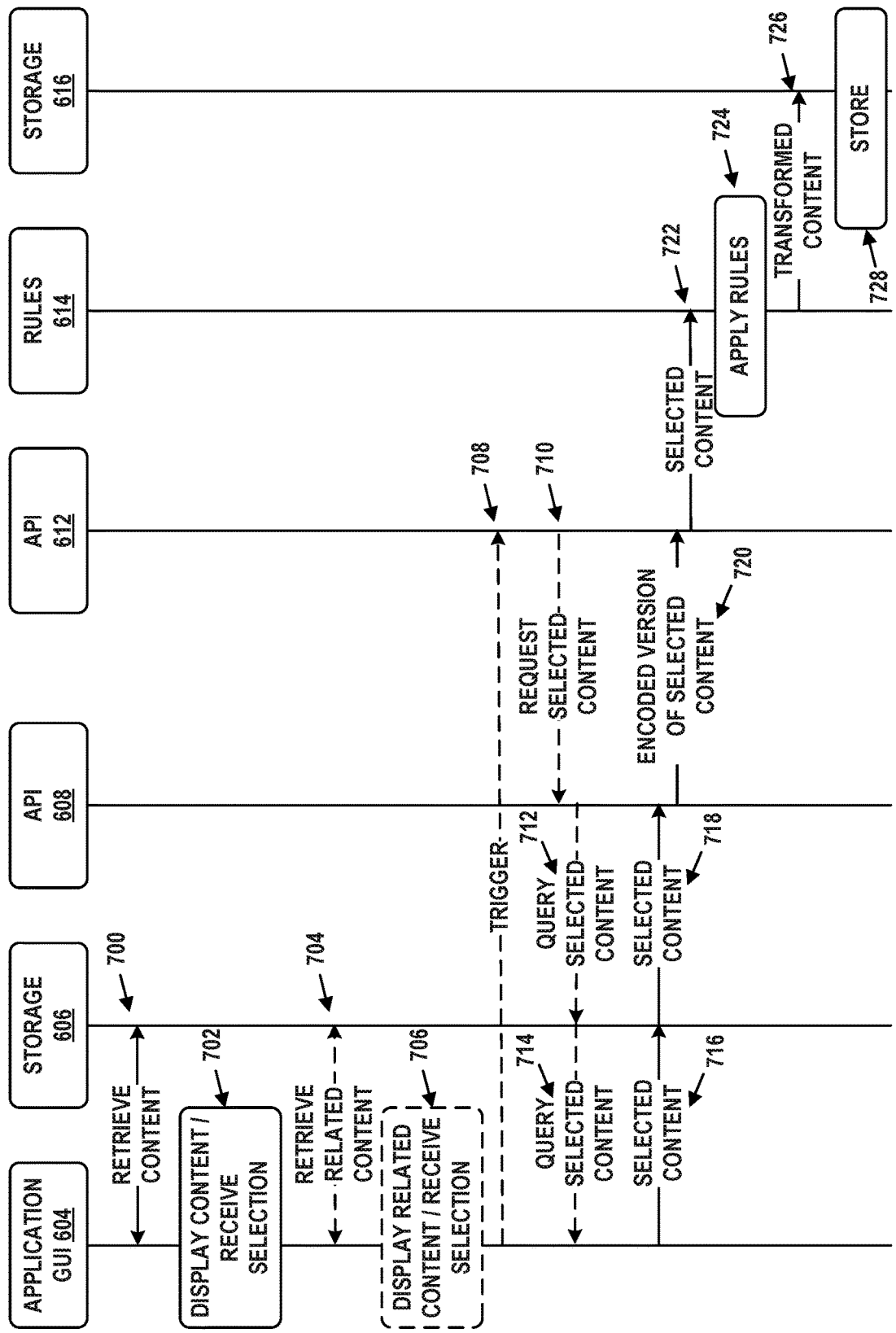
FIG. 7 is a message flow diagram, in accordance with example embodiments.

FIG. 7 is a message diagram depicting example communication paths that further illustrate these procedures. At step 700, application GUI 604 retrieves content stored in storage 606. The content may be related to or managed by the application. At step 702, application GUI 604 provides this content for display, and receives a selection of some or all of the content.

At step 704, application GUI 604 retrieves related content stored in storage 606, where the related content is referenced or in some way relevant to the selected or displayed content. At step 706, application GUI 604 displays the related content, and may receive a selection of some or all of this related content. Steps 704 and 706 are optional steps as indicated by their being shown with dashed lines. They may both be present or both be omitted.

At step 708, the application on source computational instance 602 transmits a trigger to its counterpart application on target computational instance 610. This may cause, at step 710, target computational instance 610 to request the selected content by way of API 608. This request may be passed on, in some form or another, to storage 606 at step 712 and/or the application (e.g., application GUI 604) at step 714. Steps 708, 710, 712, and 714 are optional steps as indicated by their being shown with dashed lines. They may all be present or all be omitted. In embodiments in which steps 708, 710, 712, and 714 are omitted, the selected content may be transmitted to API 612 in a suitable format (see below).

At step 716, the application (e.g., application GUI 604) initiates transmission of the selected content. This may involve, at step 718, causing storage 606 to provide the selected content to API 608. API 608 may facilitate the conversion of the selected content into a form suitable for transmission over a network or between applications, such as XML. At step 720, API 608 provides this encoded version of the selected content to target computational instance 610.

At step 722, the selected content may be provided to application upgrade/downgrade rules 614. At step 724, these rules may be applied to the selected content to transform this content. At step 726, the selected content as transformed may be provided to storage 616. At step 728, storage 616 may store the selected content as transformed.

In alternative embodiments, the target computational instance may provide an application GUI through which a user can select content (and possibly related content as well) and a source computational instance. The target computational instance may request this content by way of an API supported by the source computational instance. The target computational instance may apply upgrade/downgrade rules to this received content and then store the content as transformed.

VI. Example Operations

Figure 8:
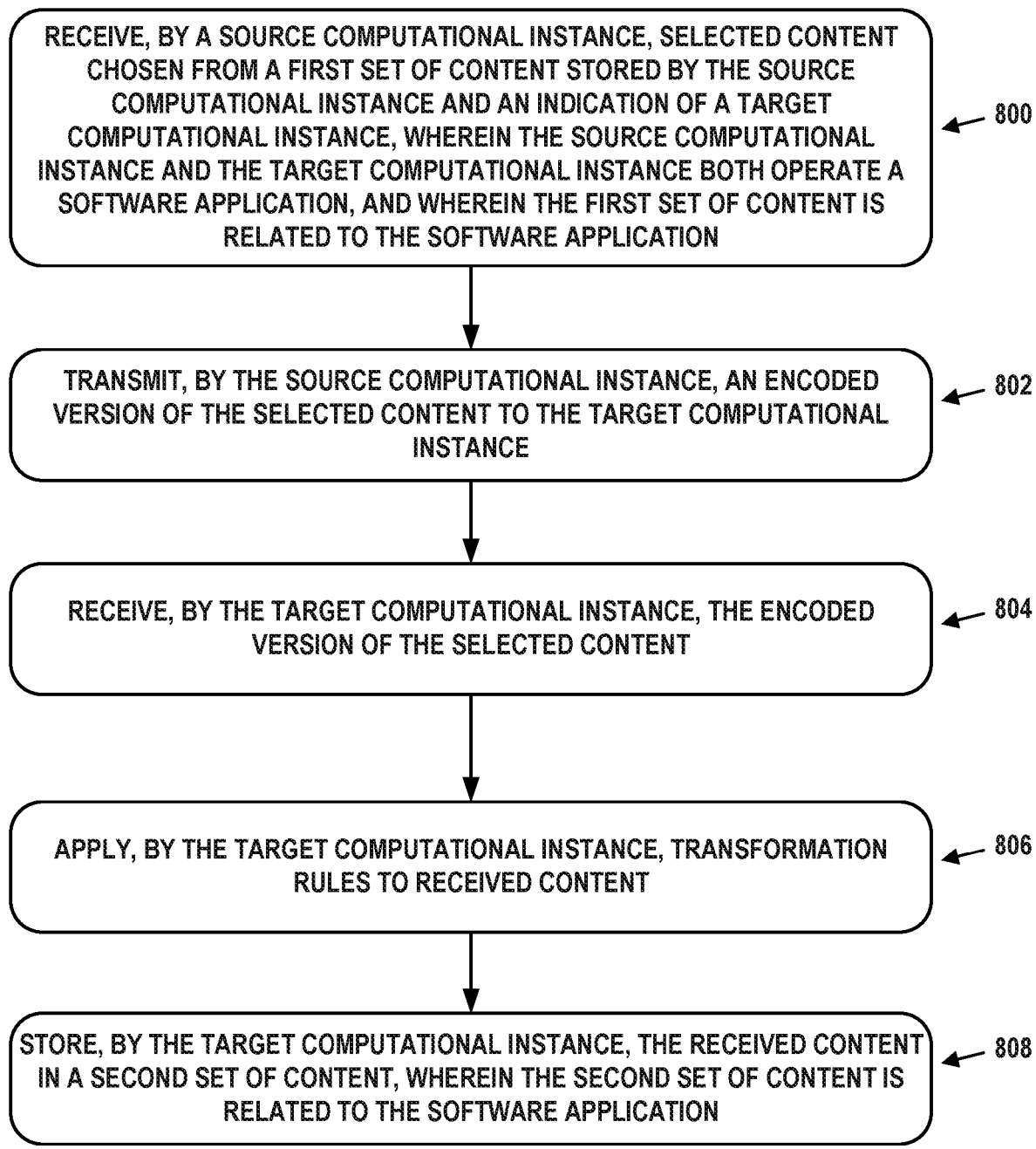
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by one or more computational instances of a remote network management platform.

The embodiments of FIG. 8 may be simplified by the removal of any one or more of the features shown therein. Further, these embodiments may be combined with features, aspects, and/or implementations of any of the previous figures or otherwise described herein.

Block 800 may involve receiving, by a source computational instance, selected content chosen from a first set of content stored by the source computational instance and an indication of a target computational instance, wherein the source computational instance and the target computational instance both operate a software application, and wherein the first set of content is related to the software application.

Block 802 may involve transmitting, by the source computational instance, an encoded version of the selected content to the target computational instance.

Block 804 may involve receiving, by the target computational instance, the encoded version of the selected content.

Block 806 may involve applying, by the target computational instance, transformation rules to received content.

Block 808 may involve storing, by the target computational instance, the received content in a second set of content, wherein the second set of content is related to the software application.

In some embodiments, the source computational instance stores at least part of the first set of content in accordance with a first database schema, wherein the target computational instance stores at least part of the second set of content in accordance with a second database schema, and wherein the first database schema and the second database schema are different. The transformation rules may cause the selected content as transformed to comply with the second database schema.

In some embodiments, the source computational instance and the target computational instance are configured to operate different versions of the software application, wherein the transformation rules are based on (i) upgrade rules defined to upgrade the software application between the different versions, or (ii) downgrade rules defined to downgrade the software application between the different versions.

In some embodiments, causing the selected content as transformed to comply with the second database schema comprises: (i) detecting data in the selected content that does not comply with the second database schema; and (ii) not storing the data as detected in the target computational instance.

In some embodiments, causing the selected content as transformed to comply with the second database schema comprises: (i) detecting data in the selected content that does not comply with the second database schema, wherein the data as detected is associated with a first database table defined by the first database schema; and (ii) storing at least part of the data as detected in a second database table defined by the second database schema, wherein the first database table and the second database table are defined differently. The first database table and the second database table may have different sets of columns or may store different data types in a column with the same name.

In some embodiments, the target computational instance is configured to have an application programming interface that receives the encoded version of the selected content, wherein transmitting the encoded version of the selected content to the target computational instance comprises forming the encoded version of the selected content by converting the selected content to comply with the application programming interface.

In some embodiments, the source computational instance is configured to have an application programming interface that provides the encoded version of the selected content in response to requests thereof, wherein transmitting the encoded version of the selected content to the target computational instance comprises: (i) forming the encoded version of the selected content by encoding the selected content to comply with the application programming interface; (ii) transmitting, to the target computational instance, a notification that the encoded version of the selected content is available by way of the application programming interface; (iii) receiving, from the target computational instance and by way of the application programming interface, a request for the encoded version of the selected content; and (iv) providing, to the target computational instance and by way of the application programming interface, the encoded version of the selected content.

In some embodiments, receiving the selected content and an indication of the target computational instance occurs by way of a graphical user interface provided by the source computational instance, and wherein the graphical user interface also suggests further content related to the selected content that can be added to the selected content. The further content may be managed by a further software application that the source computational instance is configured to operate, and is referenced by one or more entries of the selected content.

In some embodiments, the first set of content includes one or more of database schema definitions, database table entries, configuration files, or resource files.

In some embodiments, the source computational instance is further configured to, on an ongoing basis: (i) detect changes to parts of the selected content; and (ii) transmit, to the target computational instance, encoded versions of the parts of the selected content.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
at least one hardware processor configured to execute a source computational instance and a target computational instance, the source computational instance having a first application programming interface (API) of a software application and being configured to store a first set of content related to the software application, and
the target computational instance having a second application programming interface (API) of the software application, and wherein the target computational instance is configured to:
store a second set of content related to the software application;
receive new content; and
apply transformation rules to the received new content before storing the received new content in the second set of content,
wherein the first API of the source computational instance is further configured to receive selected content chosen from the first set of content and an indication of the target computational instance requesting the selected content chosen from the first set of content, and transmit an encoded version of the selected content to the target computational instance, and wherein the second API of the target computational instance is further configured to receive the encoded version of the selected content, apply the transformation rules to the selected content, and store the transformed selected content within the second set of content, wherein the transformation rules are based on (i) upgrade rules defining how the software application is upgraded between different versions, or (ii) downgrade rules defining how the software application is downgraded between the different versions.

2. The system of claim 1, wherein the source computational instance is configured to store at least part of the first set of content in accordance with a first database schema, wherein the target computational instance is configured to store at least part of the second set of content in accordance with a second database schema, and wherein the first database schema and the second database schema are different.

3. The system of claim 2, wherein the transformation rules cause the transformed selected content to comply with the second database schema.

4. The system of claim 3, wherein the source computational instance and the target computational instance are configured to operate different versions of the software application, and wherein the transformation rules are based on (i) upgrade rules defined to upgrade the software application between the different versions, or (ii) downgrade rules defined to downgrade the software application between the different versions.

5. The system of claim 3, wherein causing the transformed selected content to comply with the second database schema comprises:

detecting data in the selected content that does not comply with the second database schema; and not storing the data within the second set of content in the target computational instance.

6. The system of claim 3, wherein causing the transformed selected content to comply with the second database schema comprises:

detecting data in the selected content that does not comply with the second database schema, wherein the data is associated with a first database table defined by the first database schema; and storing at least part of the data in a second database table defined by the second database schema, wherein the first database table and the second database table are defined differently.

7. The system of claim 6, wherein the first database table and the second database table have different sets of columns.

8. The system of claim 1, wherein transmitting the encoded version of the selected content to the target computational instance comprises:

forming the encoded version of the selected content by converting the selected content to comply with the second application programming interface.

9. The system of claim 1, wherein receiving the selected content and the indication of the target computational instance occurs by way of a graphical user interface provided by the source computational instance, and wherein the graphical user interface also suggests further content related to the selected content that can be added to the selected content.

10. The system of claim 9, wherein the further content is managed by a further software application of the source computational instance, and is referenced by one or more entries of the selected content.

11. The system of claim 1, wherein the first set of content includes one or more of database schema definitions, database table entries, configuration files, or resource files.

12. The system of claim 1, wherein the source computational instance is further configured to, on an ongoing basis:

detect changes to parts of the selected content; and transmit, to the target computational instance, encoded versions of the parts of the selected content.

13. A computer-implemented method comprising:

receiving, by a first application programming interface (API) of a software application executing on a source computational instance, selected content chosen from a first set of content stored by the source computational instance and an indication of a target computational instance requesting the selected content, wherein the target computational instance has a second application programming interface (API) of the software application, and wherein the first set of content is related to the software application;

transmitting, by the first API of the source computational instance, an encoded version of the selected content to the target computational instance;

receiving, by the second API of the target computational instance, the encoded version of the selected content;

applying, by the second API of the target computational instance, transformation rules to received content, wherein the transformation rules are based on (i) upgrade rules defining how the software application is upgraded between different versions, or (ii) downgrade rules defining how the software application is downgraded between the different versions; and storing, by the second API of the target computational instance, the received content in a second set of content, wherein the second set of content is related to the software application.

14. The computer-implemented method of claim 13, wherein the source computational instance stores at least part of the first set of content in accordance with a first database schema, wherein the target computational instance stores at least part of the second set of content in accordance with a second database schema, and wherein the first database schema and the second database schema are different.

15. The computer-implemented method of claim 13, wherein transmitting the encoded version of the selected content to the target computational instance comprises:

forming the encoded version of the selected content by converting the selected content to comply with the second application programming interface.

16. The computer-implemented method of claim 13, wherein receiving the selected content and an indication of the target computational instance occurs by way of a graphical user interface provided by the source computational instance, and wherein the graphical user interface also suggests further content related to the selected content that can be added to the selected content.

17. The computer-implemented method of claim 13, wherein the first set of content includes one or more of database schema definitions, database table entries, configuration files, or resource files.

18. The computer-implemented method of claim 13, wherein the source computational instance is further configured to, on an ongoing basis:

detect changes to parts of the selected content; and transmit, to the target computational instance, encoded versions of the parts of the selected content.

19. One or more non-transitory computer-readable media, having stored thereon program instructions that, upon execution by a computing system, cause the computing system to perform operations comprising:

receiving, by a first application programming interface (API) of a software application executing on a source computational instance, selected content chosen from a first set of content stored by the source computational instance and an indication of a target computational instance requesting the selected content, wherein the target computational instance has a second application programming interface (API) of the software application, and wherein the first set of content is related to the software application;

transmitting, by the first API of the source computational instance, an encoded version of the selected content to the target computational instance;

receiving, by the second API of the target computational instance, the encoded version of the selected content;

applying, by the second API of the target computational instance, transformation rules to received content, wherein the transformation rules are based on (i) upgrade rules defining how the software application is upgraded between different versions, or (ii) downgrade rules defining how the software application is downgraded between the different versions; and storing, by the second API of the target computational instance, the received content in a second set of content, wherein the second set of content is related to the software application.

20. A system comprising:

at least one hardware processor configured to execute a source computational instance and a target computational instance, wherein the source computational instance is configured to operate a software application and store a first set of content related to the software application, and wherein the target computational instance is configured to operate the software application and store a second set of content related to the software application and wherein the target computational instance is configured to receive new content, wherein the software application operated by the target computational instance applies transformation rules to the received new content before storing the received new content in the second set of content, wherein the source computational instance is further configured to receive selected content chosen from the first set of content and an indication of the target computational instance requesting the selected content, and transmit an encoded version of the selected content to the target computational instance, wherein the source computational instance is configured to have an application programming interface that provides the encoded version of the selected content in response to requests thereof, and wherein transmitting the encoded version of the selected content to the target computational instance comprises:

forming the encoded version of the selected content by encoding the selected content to comply with the application programming interface;

transmitting, to the target computational instance, a notification that the encoded version of the selected content is available by way of the application programming interface;

receiving, from the target computational instance and by way of the application programming interface, a request for the encoded version of the selected content; and providing, to the target computational instance and by way of the application programming interface, the encoded version of the selected content;

wherein the target computational instance is further configured to receive the encoded version of the selected content, apply the transformation rules to the selected content, and store the transformed selected content within the second set of content.

* * * * *